United States Patent
Bartels

(10) Patent No.: US 11,414,063 B2
(45) Date of Patent: Aug. 16, 2022

(54) BRAKE CONTROL SYSTEM

(71) Applicant: Volkswagen Aktiengesellschaft, Wolfsburg (DE)

(72) Inventor: Arne Bartels, Wolfsburg (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 55 days.

(21) Appl. No.: 16/880,304

(22) Filed: May 21, 2020

(65) Prior Publication Data
US 2020/0369256 A1    Nov. 26, 2020

(30) Foreign Application Priority Data

May 22, 2019    (DE) .................... 10 2019 207 517.7

(51) Int. Cl.
*B60T 17/22*    (2006.01)
*B60T 8/17*    (2006.01)
*B60T 13/66*    (2006.01)

(52) U.S. Cl.
CPC .............. *B60T 17/221* (2013.01); *B60T 8/17* (2013.01); *B60T 13/662* (2013.01); *B60T 2270/402* (2013.01); *B60T 2270/413* (2013.01)

(58) Field of Classification Search
CPC ........ B60T 17/221; B60T 8/17; B60T 13/662; B60T 2270/0413; B60T 2270/402
See application file for complete search history.

(56) References Cited

U.S. PATENT DOCUMENTS

| | | | |
|---|---|---|---|
| 9,428,159 B2 | 8/2016 | Heise et al. | |
| 10,131,329 B1 * | 11/2018 | Georgin | B60T 17/221 |
| 2003/0006726 A1 | 1/2003 | Weiberle et al. | 318/370 |
| 2005/0228546 A1 | 10/2005 | Naik et al. | 701/1 |
| 2015/0291279 A1 | 10/2015 | Iordanidis et al. | 188/156 |
| 2017/0001613 A1 | 1/2017 | Stemmer et al. | 303/10 |
| 2017/0210361 A1 | 7/2017 | Kotera et al. | |
| 2019/0308596 A1 | 10/2019 | Besier et al. | |
| 2020/0070788 A1 | 3/2020 | Michels et al. | |
| 2020/0114888 A1 | 4/2020 | Michels et al. | |

(Continued)

FOREIGN PATENT DOCUMENTS

| | | | | |
|---|---|---|---|---|
| CN | 109677388 A | 4/2019 | ............. | B60T 13/74 |
| DE | 19751431 A1 | 7/1999 | ............. | B60T 13/74 |
| DE | 10118262 A1 | 10/2002 | ............. | B60T 13/66 |

(Continued)

OTHER PUBLICATIONS

German Office Action, Application No. 102019207517.7, 6 pages, dated Mar. 24, 2020.

(Continued)

*Primary Examiner* — Pamela Rodriguez
(74) *Attorney, Agent, or Firm* — Slayden Grubert Beard PLLC

(57) ABSTRACT

A brake control system for a motor vehicle comprises a first control device for controlling a first brake actuator, a second control device for controlling a second brake actuator and a third control device for controlling the first and second brake actuator. A switching apparatus is configured to connect the third control device to the first brake actuator and/or to the second brake actuator depending on a fault status of the brake control system.

15 Claims, 2 Drawing Sheets

(56) References Cited

U.S. PATENT DOCUMENTS

2020/0361428 A1\* 11/2020 Blumentritt ........... B60T 17/221
2021/0179051 A1\* 6/2021 Alford .................. B60T 13/146

FOREIGN PATENT DOCUMENTS

| DE | 102004058996 A1 | 7/2005 | ............ B60T 8/1755 |
| --- | --- | --- | --- |
| DE | 102009050399 A1 | 5/2011 | ............ B60W 10/20 |
| DE | 102011084534 A1 | 4/2012 | ............. B60T 13/66 |
| DE | 102013021871 A1 | 4/2014 | ............. B60T 17/22 |
| DE | 102015208148 A1 | 12/2015 | ............ B60T 13/138 |
| DE | 102016200691 A1 | 7/2017 | ............. B16T 13/38 |
| DE | 102016012530 A1 | 4/2018 | ............. B60T 13/74 |
| DE | 102017204157 A1 | 9/2018 | ............. B60T 13/66 |
| DE | 102017003654 A1 | 10/2018 | ............. B60T 13/66 |
| DE | 102018205957 A1 | 11/2018 | ............. B60T 13/66 |
| DE | 102017008948 A1 | 3/2019 | ............. B60T 17/22 |
| EP | 3418144 A1 | 12/2018 | ............. B60T 17/22 |

OTHER PUBLICATIONS

Extended European Search Report, Application No. 20173197.3, 7 pages, dated Jul. 22, 2020.

\* cited by examiner

| # | SG1 | A1 | B1 | BN1 | SG2 | A2 | B2 | BN2 | SG3 | S1 | S2 | S3 | S4 |
|---|---|---|---|---|---|---|---|---|---|---|---|---|---|
| 1 | ✓ | ✓ | ✓ | ✓ | ✗ | ✗ |   |   |   | 1 | 0 | 0 | 0 |
| 2 | ✓ | ✓ | ✓ | ✓ | ✗ |   | ✗ |   |   | 1 | 0 | 0 | 0 |
| 3 | ✓ | ✓ | ✓ | ✓ | ✗ |   |   | ✗ |   | 1 | 0 | 0 | 0 |
| 4 | ✓ | ✓ | ✓ | ✓ | ✗ |   |   |   | ✗ | 1 | 0 | 0 | 0 |
| 5 | ✓ | ✓ | ✓ | ✓ |   | ✗ | ✗ |   |   | 1 | 0 | 0 | 0 |
| 6 | ✓ | ✓ | ✓ | ✓ |   | ✗ |   | ✗ |   | 1 | 0 | 0 | 0 |
| 7 | ✓ | ✓ | ✓ | ✓ |   | ✗ |   |   | ✗ | 1 | 0 | 0 | 0 |
| 8 | ✓ | ✓ | ✓ | ✓ |   |   | ✗ | ✗ |   | 1 | 0 | 0 | 0 |
| 9 | ✓ | ✓ | ✓ | ✓ |   |   | ✗ |   | ✗ | 1 | 0 | 0 | 0 |
| 10 | ✓ | ✓ | ✓ | ✓ |   |   |   | ✗ | ✗ | 1 | 0 | 0 | 0 |
| 11 | ✗ | ✗ |   |   | ✓ | ✓ | ✓ | ✓ |   | 0 | 0 | 0 | 1 |
| 12 | ✗ |   | ✗ |   | ✓ | ✓ | ✓ | ✓ |   | 0 | 0 | 0 | 1 |
| 13 | ✗ |   |   | ✗ | ✓ | ✓ | ✓ | ✓ |   | 0 | 0 | 0 | 1 |
| 14 | ✗ |   |   |   | ✓ | ✓ | ✓ | ✓ | ✗ | 0 | 0 | 0 | 1 |
| 15 |   | ✗ | ✗ |   | ✓ | ✓ | ✓ | ✓ |   | 0 | 0 | 0 | 1 |
| 16 |   | ✗ |   | ✗ | ✓ | ✓ | ✓ | ✓ |   | 0 | 0 | 0 | 1 |
| 17 |   | ✗ |   |   | ✓ | ✓ | ✓ | ✓ | ✗ | 0 | 0 | 0 | 1 |
| 18 |   |   | ✗ | ✗ | ✓ | ✓ | ✓ | ✓ |   | 0 | 0 | 0 | 1 |
| 19 |   |   | ✗ |   | ✓ | ✓ | ✓ | ✓ | ✗ | 0 | 0 | 0 | 1 |
| 20 |   |   |   | ✗ | ✓ | ✓ | ✓ | ✓ | ✗ | 0 | 0 | 0 | 1 |
| 21 | ✗ |   | ✓ | ✓ | ✗ |   | ✓ | ✓ | ✓ | 0 | 1 | 1 | 0 |
| 22 | ✗ |   | ✓ | ✓ |   | ✗ | ✓ | ✓ | ✓ | 0 | 1 | 1 | 0 |
| 23 |   | ✗ | ✓ | ✓ | ✗ |   | ✓ | ✓ | ✓ | 0 | 1 | 1 | 0 |
| 24 |   | ✗ | ✓ | ✓ |   | ✗ | ✓ | ✓ | ✓ | 0 | 1 | 1 | 0 |
| 25 | ✗ |   | ✓ |   | ✓ | ✓ | ✗ | ✓ | ✓ | 0 | 1 | 0 | 0 |
| 26 |   | ✗ | ✓ |   | ✓ | ✓ | ✗ | ✓ | ✓ | 0 | 1 | 0 | 0 |
| 27 | ✓ | ✓ | ✗ | ✓ | ✗ |   | ✓ |   | ✓ | 0 | 0 | 1 | 0 |
| 28 | ✓ | ✓ | ✗ | ✓ |   | ✗ | ✓ |   | ✓ | 0 | 0 | 1 | 0 |
| 29 | ✓ | ✓ | ✗ | ✓ |   |   | ✗ |   |   | 0 | 0 | 0 | 0 |
| 30 | ✓ | ✓ | ✗ | ✓ |   |   |   | ✗ |   | 0 | 0 | 0 | 0 |
| 31 |   |   |   | ✗ | ✓ | ✓ | ✗ | ✓ |   | 0 | 0 | 0 | 0 |
| 32 | ✗ |   | ✓ | ✓ |   |   |   | ✗ | ✓ | 0 | 1 | 0 | 0 |
| 33 |   | ✗ | ✓ | ✓ |   |   |   | ✗ | ✓ | 0 | 1 | 0 | 0 |
| 34 |   |   |   | ✗ | ✗ |   | ✓ | ✓ | ✓ | 0 | 0 | 1 | 0 |
| 35 |   |   |   | ✗ |   | ✗ | ✓ | ✓ | ✓ | 0 | 0 | 1 | 0 |

Fig.3

BRAKE CONTROL SYSTEM

CROSS-REFERENCE TO RELATED APPLICATIONS

This application claims priority to German Patent Application No. DE 10 2019 207 517.7, filed on May 22, 2019 with the German Patent and Trademark Office. The contents of the aforesaid patent application are incorporated herein for all purposes.

TECHNICAL FIELD

The present invention relates to a brake control system for a motor vehicle, comprising a first control device for controlling a first brake actuator of the motor vehicle and a second control device for controlling a second brake actuator of the motor vehicle. The invention also relates to a corresponding motor vehicle.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Known brake control systems for partially automated driving, in particular in accordance with Level 3 of the SAE-J3016 classification, are designed to be fault-tolerant for a short period of time, such that the brake control system remains operational, i.e. "fail-operational", for approximately 30 seconds in the event of an operationally relevant malfunction in said system. This time is used, for example, to prompt the driver to take over control and, if they have not done so within 10 seconds, for example, to brake the vehicle to a stop in an automated manner within 20 seconds, for example.

Known brake control systems of this kind may be designed with single redundancy. In other words, operationally relevant components of the brake control system that have not been sufficiently tested in operation and that may potentially be at risk of failing are doubly provided.

In the case of partially automated driving with a higher degree of automation or in the case of fully automatic driving, in particular in the case of driving in accordance with Level 4 or Level 5 of the SAE-J3016 classification, the driver is by definition no longer available as backup. For example, the driver is even able to sleep during a fully automatic journey. Accordingly, in such cases, a brake control system must remain fault-tolerant ("fail-operational") for significantly longer than 30 seconds in order to bring the vehicle into as safe a state as possible after an operationally relevant malfunction. Due to this requirement, the occurrence of double faults cannot be overlooked per se, in particular the occurrence of a fault in each redundant subsystem. Therefore, single redundancy of the brake control system, as provided in known brake control systems, does not offer a sufficient level of safety.

Document DE 10 2017 204157 A1 describes a brake regulation system of an electrohydraulic braking assembly. The brake regulation system comprises a service brake having at least two hydraulic wheel brakes. A parking brake is used as a redundant brake system. The parking brake may be activated by the same control device as the service brake or alternatively another independent control unit for controlling the parking brake may be used.

In the document DE 10 2013 021871 A1, a motor vehicle having two separate redundant brake circuits is described.

SUMMARY

An object of the present invention is to provide an improved brake control system for a motor vehicle that can be operated automatically at least in part and that improves the fault tolerance of the brake control system.

This object is solved by a brake control system and a motor vehicle according to the independent claims. Embodiments of the invention are discussed in the dependent claims and the following description.

In one exemplary aspect, a brake control system for a motor vehicle is provided. The brake control system comprises at least a first control device for controlling a first brake actuator of the motor vehicle and a second control device for controlling a second brake actuator of the motor vehicle. The brake control system further comprises a third control device for controlling the first brake actuator and the second brake actuator, and a switching apparatus, which is configured to connect the third control device to one or more of the first brake actuator and to the second brake actuator depending on a fault status of the brake control system.

In another exemplary aspect, a motor vehicle comprising a brake control system is provided.

The details of one or more embodiments are set forth in the accompanying drawings and the description below. Other features will be apparent from the description, drawings, and from the claims.

BRIEF DESCRIPTION OF THE DRAWINGS

FIG. 3 shows a fault case table of another exemplary embodiment of a brake control system.

DETAILED DESCRIPTION

Figure 1:
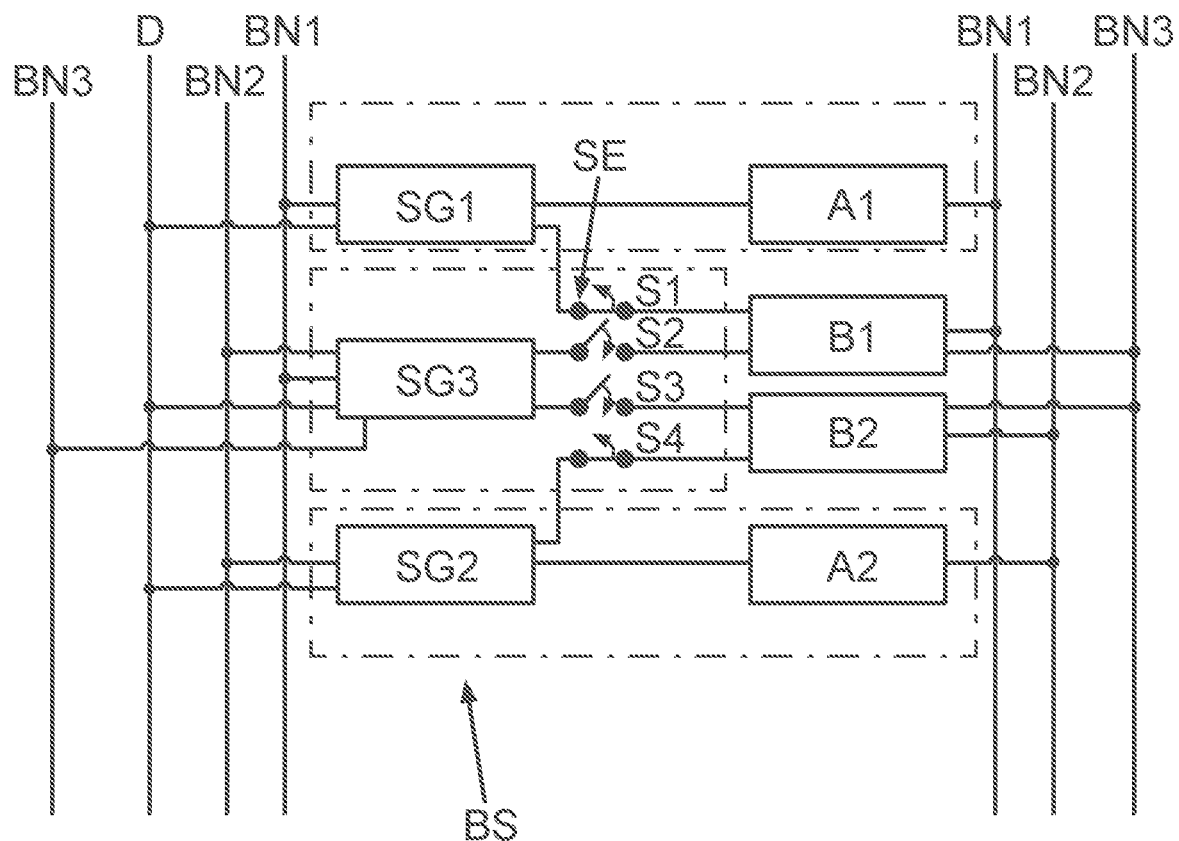
FIG. 1 shows a block diagram of an exemplary embodiment of a brake control system.

Specific embodiments of the invention are described in detail, below. In the following description of embodiments of the invention, the specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

The improved system is based on the idea of providing an additional control device and a switching apparatus in addition to two redundant brake circuits, wherein it is possible for the switching apparatus to connect the additional control device either to one or both brake actuators of the two redundant brake circuits depending on a fault status of the brake control system.

According to a first independent and exemplary aspect, a brake control system for a motor vehicle is presented, the brake control system comprising a first control device for controlling a first brake actuator of the motor vehicle and a second control device for controlling a second brake actuator of the motor vehicle. The brake control system also comprises a third control device for controlling the first brake actuator and for controlling the second brake actuator, as well as a switching apparatus, which is configured to connect the third control device to the first brake actuator and/or to the second brake actuator depending on a fault status of the brake control system.

The brake actuators of the motor vehicle, and if applicable other brake actuators of the motor vehicle, may be part of the brake control system. Alternatively, the brake actuators may be provided separately to the brake control system and not be part of the brake control system.

The motor vehicle may in some embodiments be a motor vehicle that can be operated automatically at least in part. For example, it may be a motor vehicle for partially automatic driving in accordance with Level 3 or Level 4 of the SAE-J3016 classification or a motor vehicle for fully automatic, fully automated or fully autonomous driving as per Level 5 of the SAE-J3016 classification.

In some embodiments, the motor vehicle is a motor vehicle according to Level 4 or Level 5 of the SAE-J3016 classification.

The first control device and the first brake actuator are for example part of a first or primary brake circuit. The second brake actuator and the second control device are for example part of a second or secondary brake circuit. The primary and the secondary brake circuit are in some embodiments designed to be redundant to one another.

The switching apparatus is in some embodiments configured to connect the third control device to or isolate, for example galvanically isolate, same from the first brake actuator depending on the fault status. The switching apparatus is in some embodiments configured to connect the third control device to or isolate, in some embodiments galvanically isolate, same from the second brake actuator depending on the fault status.

If the third control device is connected to one of the brake actuators, the third control device can activate the relevant brake actuator. If the third control device is galvanically isolated from one of the brake actuators, it is not possible to control the relevant brake actuator by means of the third control device.

In some embodiments, the brake control system, for example one of the control devices, is configured to control the switching apparatus in order to connect or isolate the third control device to or from the first and/or second brake actuator.

The brake control system may also be referred to as a brake regulation system, e.g., a closed-loop control system.

By providing the third control device and the switching apparatus, double redundancy of the brake control system may be effectively achieved. Single redundancy is in some embodiments achieved by means of the first and second control device together with the first and second brake actuator, i.e., by means of the primary and secondary brake circuit. In the event of an operationally relevant fault of the brake regulation system or brake control system, the third control device may be used to control the first and/or second brake actuator, as a result of which a second redundancy level is implemented. This way, the brake control system can remain operational even in the event of two operationally relevant malfunctions or faults in various brake circuits, and therefore the brake control system can be considered to be fault-tolerant (in the following also referred to as "fail-operational") for longer periods of time. This is due to the fact that the probability of a triple fault, which relates both to the primary and to the secondary brake circuit and to the third control device or the switching apparatus, is far lower than for a double fault and far, far lower than a single fault.

"Fault-tolerant" or "fail-operational" can be understood to mean that the brake control system continues to function in the event of a fault. Therefore, the brake control system remains operational.

By improving the fault tolerance, in some embodiments by means of the longer times for which fail-operational use of the brake control system can be assumed, the brake control system can also be used for partially or fully automated motor vehicles in which a driver is no longer available as a potential backup in the event of an operationally relevant fault. In some embodiments, the brake control system can also be used for partially automated motor vehicles as per Level 4 of the SAE-J3016 classification and for fully automated motor vehicles as per Level 5 of the SAE-J3016 classification.

In addition, in contrast with a system designed with single redundancy, the improved system does not require additional brake actuators to be provided, which results in low complexity, little installation space and low cost of the brake control system.

The brake actuators may for example each comprise a brake booster. Additionally, the brake actuators may for example each comprise a drive unit, for example a hydraulic, pneumatic, electronic or electric drive unit, in order to be able to actuate a brake assigned to the relevant brake actuator, in particular activated by the relevant control device provided for control purposes.

According to some embodiments of the brake control system, the first and second brake actuator each serve to actuate an associated parking brake of the motor vehicle.

According to some embodiments of the brake control system, the first control device can be or is connected to a first on-board power supply of the motor vehicle in order to supply power to the first control device. The second control device can be or is connected to a second on-board power supply of the motor vehicle in order to supply power to the second control device. The third control device can be or is connected to the first on-board power supply and to the second on-board power supply, for example can be or is simultaneously or optionally connected to the first and second on-board power supply, in order to supply power to the third control device.

For example, the first brake actuator can be or is connected to the first on-board power supply in order to supply power to the first brake actuator, and the second brake actuator can be or is connected to the second on-board power supply in order to supply power to the second brake actuator.

An on-board power supply may in some embodiments be an energy or voltage supply of the motor vehicle.

The first and the second on-board power supply are in some embodiments designed to be redundant to one another.

By designing the on-board power supplies to be redundant, the brake control system can remain fail-operational even in the event of an operationally relevant malfunction or fault in one of the on-board power supplies.

In some embodiments, the third control device can be or is connected to both on-board power supplies, such that the functioning of the third control device is not impaired by failure of one of the two on-board power supplies.

According to some embodiments, the brake control system at least partially includes the first and second on-board power supply.

According to some embodiments, the third control device can be connected to a third on-board power supply of the motor vehicle in order to supply power to the third control device.

The third control device may be connectable to the third on-board power supply as an alternative or in addition to being connected to the first and second on-board power supply.

By providing the third on-board power supply, provision is made for the simultaneous failure of the first and second on-board power supply, and therefore the brake control system can remain fail-operational in this case as well.

In some embodiments, the third on-board power supply is designed to be redundant to the first and second on-board power supply.

According to some embodiments, the brake control system at least partially includes the third on-board power supply.

According to some embodiments, the first control device can be or is connected to another first brake actuator of the motor vehicle and is configured to control the other first brake actuator, for example if it is connected thereto.

According to some embodiments, the second control device can be or is connected to another second brake actuator of the motor vehicle and is configured to control the other second brake actuator, for example if it is connected thereto.

In some embodiments, the first control device may be connectable or connected to the first other brake actuator and/or the second control device may be connectable or connected to the second other brake actuator such that the connection exists in each case independently of the switching apparatus and in particular in each case independently of the fault status of the motor vehicle.

The other brake actuators may in some embodiments be brake actuators for actuating respectively assigned service brakes of the motor vehicle.

Therefore, the first control device can activate the first brake actuator and/or the first other brake actuator, the second control device can activate the second brake actuator and/or the second other brake actuator, and the third control device can activate the first and the second brake actuator.

As a result, all single faults of the brake control system can be provided for, as can all variants of double faults. A double fault can in some embodiments be understood to mean a fault in which two operationally relevant malfunctions or faults of different components, for example of the control devices, the brake actuators, the other brake actuators and the on-board power supplies, occur. Exempt from this are fault situations in which the first and second on-board power supply fail at the same time and in which the third on-board power supply is not provided.

According to some embodiments, the switching apparatus is configured to connect the first control device to the first brake actuator or to isolate, e.g., galvanically isolate, the first control device from the first brake actuator depending on the fault status.

According to some embodiments, the switching apparatus is configured to connect the second control device to the second brake actuator or to isolate, e.g., galvanically isolate, the second control device from the second brake actuator depending on the fault status.

In some embodiments, the switching apparatus is configured to isolate the first control device from the first brake actuator if the third control device is connected to the first brake actuator and to isolate the third control device from the first brake actuator if the first control device is connected to the first brake actuator. Moreover, the switching apparatus is for example configured to isolate the second control device from the second brake actuator if the third control device is connected to the second brake actuator and to isolate the third control device from the second brake actuator if the second control device is connected to the second brake actuator.

According to some embodiments, the switching apparatus comprises a first switching element for connecting the first control device to the first brake actuator and for isolating, e.g., galvanically isolating, the first control device from the first brake actuator.

In some embodiments, the first switching element is connected to the first control device and can be or is connected to the first brake actuator, such that the first switching element is or can be arranged between the first control device and the first brake actuator.

According to some embodiments, the switching apparatus comprises a second switching element for connecting the third control device to the first brake actuator and for isolating, e.g., galvanically isolating, the third control device from the first brake actuator.

In some embodiments, the second switching element is connected to the third control device and can be or is connected to the first brake actuator, such that the second switching element is or can be arranged between the third control device and the first brake actuator.

According to some embodiments, the switching apparatus comprises a third switching element for connecting the third control device to the second brake actuator and for isolating, e.g., galvanically isolating, the third control device from the second brake actuator.

In some embodiments, the third switching element is connected to the third control device and can be or is connected to the second brake actuator, such that the third switching element is or can be arranged between the third control device and the second brake actuator.

According to some embodiments, the switching apparatus comprises a fourth switching element for connecting the second control device to the second brake actuator and for isolating, e.g., galvanically isolating, the second control device from the second brake actuator.

In some embodiments, the fourth switching element is connected to the second control device and can be or is connected to the second brake actuator, such that the fourth switching element is or can be arranged between the second control device and the second brake actuator.

According to some embodiments, the first control device, the second control device or the third control device are designed as a switching control device or the brake control systems comprises a fourth control device, which is designed as a switching control device. The switching control device is coupled or connected to the switching apparatus and is configured to control the switching apparatus, for example the switching elements, depending on the fault status, e.g., to open or close the switching elements in order to connect the third control device to the first brake actuator and/or the second brake actuator or to isolate the third control device from the first brake actuator and/or the second brake actuator.

The switching control device is in some embodiments also configured to control the switching apparatus in order to connect the first control device to or to isolate same from the first brake actuator and is configured to connect the second control device to or to isolate same from the second brake actuator.

A benefit of the embodiments of the third control device or fourth control device as a switching control device is that the first or second switching control device of a system that is for example already present does not have to be specifically adapted in order to control the switching apparatus. In the embodiments of the third control device as a switching control device, there is also the advantage that the fourth control device is not needed.

According to some embodiments, the first control device is or can be connected to a data transmission system of the motor vehicle in order to receive control commands for controlling the first brake actuator and/or for controlling the first other brake actuator.

According to some embodiments, the second control device is or can be connected to the data transmission system in order to receive control commands for controlling the second brake actuator and/or the second other brake actuator.

According to some embodiments, the third control device is or can be connected to the data transmission system in order to receive control commands for controlling the first brake actuator and/or the second brake actuator.

According to some embodiments, the switching control device is or can be connected to the data transmission system in order to receive a fault signal that depends on the fault status of the motor vehicle.

The fault signal in some embodiments uniquely defines the fault status of the motor vehicle or of the brake control system.

The data transmission system may for example be designed as a data bus system, for example as a field bus system, in particular as a CAN bus system.

According to some embodiments, the brake control system at least partially comprises the data transmission system.

The data transmission system may for example be connected to a central control unit or to another control device of the motor vehicle in order to receive control commands.

The central control unit may for example also provide the fault signal. Alternatively, the fault signal or respective components of the control signal may be provided by the first and/or second control device.

According to some embodiments, the brake control system includes the first and second brake actuator. The first control device and the third control device are each connected to the first brake actuator via the switching apparatus, e.g., the first control device is connected via the first switching element and the third control device is connected via the second switching element. The second control device and the third control device are each connected to the second brake actuator via the switching apparatus, e.g., the third control device is connected via the third switching element and the second control device is connected via the fourth switching element.

The switching apparatus, or rather the switching elements, are therefore arranged between the relevant control device and the relevant brake actuator.

According to some embodiments, the control device is connected to the first other brake actuator and the second control device is connected to the second other brake actuator.

According to another independent and exemplary aspect, a motor vehicle comprising a brake control system according to the first exemplary aspect or one or more of its embodiments is provided.

The motor vehicle may for example be operated in a partially or fully automatic manner and in particular equates to a motor vehicle according to Level 4 or Level 5 of the SAE-J3016 classification.

The present discussion also includes combinations of the features of the described embodiments.

Reference will now be made to the drawings in which the various elements of embodiments will be given numerical designations and in which further embodiments will be discussed.

Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the figures may be purposely distorted to make certain features or relationships easier to understand.

In the exemplary embodiments described herein, the described components of the embodiments each represent individual features of the invention that should be considered independent of one another, and should therefore be considered as a part of the invention both individually or in another combination other than that shown. In addition, the described embodiments can also be supplemented by other features of the invention than those already described.

FIG. 1 shows an exemplary embodiment of a brake control system BS.

The brake control system BS comprises a first brake actuator B1, which is connected to a first on-board power supply BN1 of a motor vehicle K in order to be supplied with power. The brake control system BS also comprises a first control device SG1, which is also connected to the first on-board power supply BN1 in order to be supplied with power and which is connected to a data bus D of the motor vehicle K. The brake control system BS also comprises a switching apparatus SE, which includes a first switch S1. The first control device SG1 can be connected to the first brake actuator B1 via the first switch S1.

The brake control system BS also comprises a second brake actuator B2, which is connected to a second on-board power supply BN2 of the motor vehicle K in order to be supplied with power. The brake control system BS comprises a second control device SG2, which is connected to the second on-board power supply BN2 in order to be supplied with power. Moreover, the second control device SG2 is connected to the data bus D. The switching apparatus SE comprises a fourth switch S4, via which the second control device SG2 can be connected to the second brake actuator B2.

The brake control system BS also comprises a third control device SG3, which is connected to both the first on-board power supply BN1 and to the second on-board power supply BN2 in order to be supplied with power. The on-board power supplies BN1, BN2 may each serve as the power supply for the third control device SG3 independently of one another. The switching apparatus SE comprises a second switch S2, by means of which the third control device SG3 can be connected to the first brake actuator B1, and a third switch S3, by means of which the third control device SG3 can be connected to the second brake actuator B2.

The brake control system BS may for example comprise another first brake actuator A1, which is connected to the first on-board power supply BN1 in order to be supplied with power and which is connected to the first control device SG1. Moreover, the brake control system BS may comprise a second other brake actuator A2, which is connected to the second on-board power supply BN2 in order to be supplied with power and which is connected to the second control device SG2.

Optionally, the motor vehicle K may comprise a third on-board power supply BN3, which may be connected to the third control device SG3 in order to supply power thereto. Power may be supplied to the third control device SG3 via the third on-board power supply BN3 as an alternative or in addition to the power supply via the first and/or second on-board power supply BN1, BN2. For example, the first and the second brake actuator B1, B2 may be connected to the third on-board power supply BN3 in order to be supplied with power, in particular in addition to the power supply via the first on-board power supply BN1 and second on-board power supply BN2, respectively.

Figure 2:
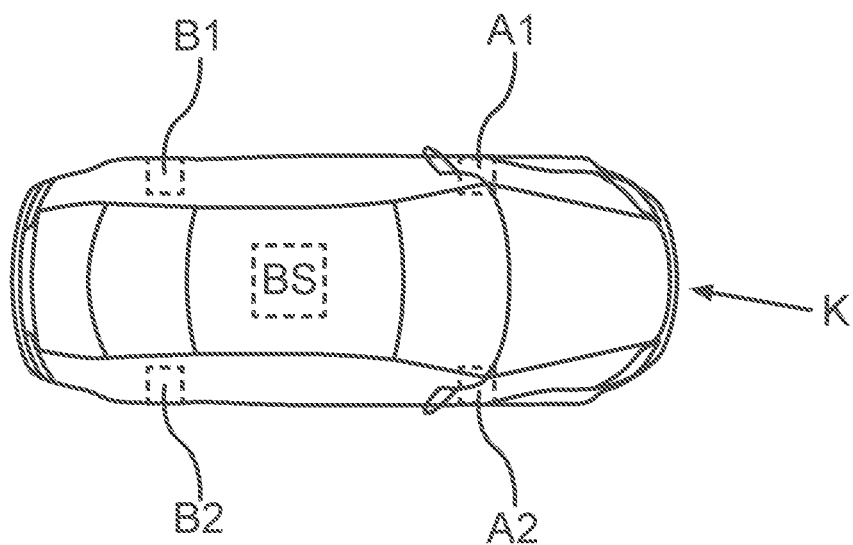
FIG. 2 shows an exemplary embodiment of a motor vehicle.

FIG. 2 schematically shows an exemplary embodiment of a motor vehicle K. The motor vehicle K comprises a brake control system BS as described herein, for example a brake control system BS as shown in FIG. 1 and as described with reference to FIG. 1.

In the example in FIG. 2, the brake actuators B1, B2 may for example be brake actuators for parking brakes of the motor vehicle K and may for example be arranged on rear wheels of the motor vehicle K. The other brake actuators A1, A2 may for example be brake actuators for service brakes of the motor vehicle K and may for example be arranged on front wheels of the motor vehicle K.

Again referring to FIG. 1, the third control device SG3 may for example be connected to the switches S1, S2, S3, S4 of the switching apparatus SE in order to control said switches, in particular to either open or close same. The third control device SG3 may for example receive a fault signal via the data bus D, for example from a central control unit of the motor vehicle K and/or from the control devices SG1, SG2, the fault signal containing information about a fault status of the brake control system BS. In particular, the third control device SG3 may determine, based on the fault signal, whether a fault or malfunction, in particular an operationally relevant fault or malfunction, in one of the control devices SG1, SG2, SG3, one of the brake actuators A1, A2, B1, B2, and/or one of the on-board power supplies BN1 or BN2 has occurred.

Depending on the fault signal and the corresponding fault status of the brake control system BS, the third control device SG3 can connect the control devices SG1, SG2, SG3 to or galvanically isolate same from the brake actuators B1, B2 in a targeted manner in order to ensure the operational readiness of the brake control system BS, even in the event of faults in the above-mentioned components of the brake control system BS.

Subject to any malfunctions, the first control unit SG1 can activate the first other brake actuator A1 and, in particular if the first switch S1 is closed, the first brake actuator B1. The second control device SG2 can, subject to any malfunctions, activate the second other brake actuator A2 and, in particular if the fourth switch S4 is closed, the second brake actuator B2. The third control device can activate the first brake actuator B1 when the second switch S2 is closed and the second brake actuator B2 when the third switch S3 is closed.

The brake actuators B1, B2 may for example be configured to achieve a deceleration of the motor vehicle K of 2.44 m/s$^2$ or more. The other brake actuators A1, A2 are for example configured to also produce a deceleration of the motor vehicle K of at least 2.44 m/s$^2$. For example, the other brake actuators A1, A2 are configured to achieve a deceleration of the motor vehicle K of at least 6.45 m/s$^2$.

By virtue of the various options for connecting the control devices SG1, SG2 and SG3 to the first brake actuator B1 and/or second brake actuator B2 via the switching apparatus SE, effective actuation of at least one of the brake actuators A1, A2, B1, B2 remains possible in the event of failure of up to two of the control devices SG1, SG2, SG3, brake actuators A1, A2, B1, B2 and on-board power supplies BN1, BN2, with the exception of simultaneous failure of both on-board power supplies BN1, BN2. Because each of the brake actuators A1, A2, B1, B2 can achieve a required or, for example, prescribed minimum deceleration, for example 2.44 m/s$^2$, in the event of each of the described fault cases this specification can be met and the brake control system BS can remain fail-operational.

FIG. 3 shows a fault table which lists various fault statuses or fault cases of a brake control system BS as shown for example in FIG. 1. The optional third on-board power supply BN3, for example, is not provided here. The first column of the table shows a serial number of the fault status. The second column corresponds to a status of the first control device SG1, the third column to a status of the first other brake actuator A1, the fourth column to a status of the first brake actuator B1 and the fifth column to a status of the first on-board power supply BN1. The sixth column corresponds to a status of the second control device SG2, the seventh column corresponds to a status of the second other brake actuator A2, the eighth column corresponds to a status of the second brake actuator B2 and the ninth column corresponds to a status of the second on-board power supply BN2. The tenth column corresponds to a status of the third control device SG3. The eleventh column corresponds to a switching state of the first switch S1, the twelfth column corresponds to a switching state of the second switch S2, the thirteenth column corresponds to a switching state of the third switch S3 and the fourteenth column corresponds to a switching state of the fourth switch S4.

A switching state of a switch S1, S2, S3, S4 that corresponds to an open switch is denoted by 0 and a switching state that corresponds to a closed switch is indicated by 1. A cross ("x") against one of the components means that an operationally relevant malfunction of the relevant component has occurred. If no cross is present, no operationally relevant malfunction of the relevant component has occurred. A check "✓" against one of the components means that the relevant component can be used to provide a braking effect for the motor vehicle K in the corresponding fault scenario.

A situation in which a simultaneous fault in both on-board power supplies BN1 and BN2 has occurred is not considered here. In the case of robust on-board power supplies, it can be assumed that such faults are highly unlikely and negligible for corresponding use cases. In particular, in the event of a malfunction in one of the control devices SG1, SG2, SG3 or one of the brake actuators B1, B2, the switch S1, S2, S3, S4 which is connected to the relevant component is opened such that the corresponding control device SG1, SG2, SG3 is galvanically isolated from the corresponding brake actuator B1, B2.

The 35 fault statuses shown in FIG. 3 may for example be split into nine groups. These individual groups differ in each case in terms of the components which achieve the required braking effect in the event of a fault as well as in terms of the associated switch positions. By way of clarification, the first control device SG1, the first on-board power supply BN1 and the first and other first brake actuators B1, A1 are assigned to a primary brake circuit and the second control device SG2, the second on-board power supply BN2, the second brake actuator B2 and the second other brake actuator A2 are assigned to a secondary brake circuit.

Moreover, it is assumed in the following, without loss of generality, that each of the brake actuators B1, B2 can achieve a braking deceleration of 2.44 m/s² or more and each of the other brake actuators A1, A2 can achieve a braking deceleration of 6.45 m/s² or more.

The fault cases 1 to 10 can be ascribed to a first group. The feature common to all these fault cases is that operationally relevant faults have occurred in two components of the secondary brake circuit. Accordingly, the third control unit SG3 is configured to close the first switch S1 and open the remaining switches S2, S3, S4. The first control device SG1 can activate the first brake actuator B1 and the other first brake actuator A1 such that the secondary brake circuit can produce a braking deceleration of at least 6.45 m/s²+2.44 m/s²=8.89 m/s².

The fault cases 11 to 20 can be ascribed to a second group. The feature common to the fault cases of the second group is that two operationally relevant malfunctions or faults have occurred in different components of the primary brake circuit. Accordingly, the third control unit SG3 is configured to close the fourth switch S4 and open the remaining switches S1, S2, S3. The second control device SG2 can activate the second brake actuator B2 and the other second brake actuator A2 such that the secondary brake circuit can produce a minimum braking deceleration of 8.89 m/s².

The fault cases 21 to 24 can be assigned to a third group, in which the first control device SG1 or the first other brake actuator A1 in the primary brake circuit and the second control device 2 or the second other brake actuator A2 in the secondary brake circuit have experienced an operationally relevant fault.

The third control device SG3 is accordingly configured to close the second switch S2 and the third switch S3 and to open the first switch S1 and the fourth switch S4. Consequently, the third control device can activate the first and second brake actuator B1, B2 and thus achieve a minimum braking deceleration of 2×2.44 m/s²=4.88 m/s².

The fault cases 25 and 26 can be assigned to a fourth group, in which the second brake actuator B2 in the secondary brake circuit and either the first control device SG1 or the first other brake actuator A1 in the primary brake circuit have experienced an operationally relevant malfunction. Accordingly, the third control device SG3 is configured to close the second switch S2 and open the remaining switches S1, S3, S4. The second control device SG3 can accordingly activate the other second brake actuator A2 and the third control device SG3 can activate the first brake actuator B1 such that a total minimum braking deceleration of 8.89 m/s² can be achieved.

The fault cases 27 and 28 can be assigned to a fifth group, in which the first brake actuator B1 in the primary brake circuit and either the second control device SG2 or the second other brake actuator A2 in the secondary brake circuit have experienced an operationally relevant malfunction. Accordingly, the third control device SG3 is configured to close the third switch S3 and open the remaining switches S1, S2, S4. As a result, the first control device can activate the first other brake actuator A1 and the third control device SG3 can activate the second brake actuator B2, and therefore a minimum braking deceleration of 8.89 m/s² can be achieved.

The fault cases 29 and 30 can be assigned to a sixth group, in which the first brake actuator B1 in the primary brake circuit and either the second brake actuator B2 or the second on-board power supply BN2 in the secondary brake circuit have experienced an operationally relevant malfunction. Accordingly, the third control device SG3 is configured to open all four switches S1, S2, S3, S4. The first control device SG1 is then in a position to activate the first other brake actuator A1 in order to achieve a minimum braking deceleration of 6.45 m/s².

The fault case 31 corresponds to a seventh group, in which an operationally relevant malfunction has occurred in the first on-board power supply BN1 in the primary brake circuit and an operationally relevant malfunction has occurred in the second brake actuator B2 in the second brake circuit. Accordingly, the third control device SG3 is configured to open all four switches S1, S2, S3, S4 here as well. In this case, the second control device SG2 can activate the second other brake actuator A2 such that a minimum braking deceleration of 6.45 m/s² can be achieved.

The fault cases 32 and 33 can be assigned to an eighth group, in which the first control device SG1 or the first other brake actuator A1 in the primary brake circuit and the second on-board power supply BN2 in the secondary brake circuit have experienced an operationally relevant malfunction. In this case, the third control device SG3 is configured to close the second switch S2 and open the remaining switches S1, S3, S4. As a result, the third control device SG3 can activate the first brake actuator B1 such that a minimum braking deceleration of 2.44 m/s² can be achieved.

The fault cases 34 and 35 can be assigned to a ninth group, in which an operationally relevant malfunction has occurred in the first on-board power supply BN1 in the primary brake circuit and an operationally relevant malfunction has occurred either in the second control device SG2 or in one of the second other brake actuators A2 in the secondary brake circuit. Accordingly, the third control device SG3 is configured to close the third switch S3 and open the remaining switches S1, S2, S4. As a result, the third control device SG3 can activate the second brake actuator B2 in order to again achieve a minimum braking deceleration of 2.44 m/s².

By way of example, some fault cases shall be considered individually. In the fault case 21, the first control device SG1 and the second control device SG2, for example, fail at the same time, which is detected by the third control device SG3 by means of the fault signal. The third control device SG3 then opens the first switch S1 and the fourth switch S4 and closes the second switch S2 and the third switch S3, as a result of which the third control device SG3 is galvanically isolated from the remaining control devices SG1 and SG2 and can now activate the brake actuators B1 and B2. The same applies to a simultaneous failure of the second control device SG2 and the first other brake actuator A1 in fault case 22, and to a simultaneous failure of the first other brake actuator A1 and the second other brake actuator A2 in fault case 24.

If, for example, the first brake actuator B1 in the primary brake circuit and the second control device SG2 or the second on-board power supply BN2 in the secondary brake circuit fail, as in the fault cases 27 and 30, the braking effect can be produced via the third control device SG3 and second brake actuator B2 alone. For this purpose, the third switch S3 is closed and the first, second and fourth switch S1, S2, S4 are opened.

In particular, in the fault cases 1 to 31, a minimum deceleration of greater than 2.44 m/s² is achieved. In the fault cases 32 and 33, in which a fault has occurred in the first control device SG1 or first other brake actuator A2 in the primary brake circuit and a fault has occurred in the second on-board power supply BN2 in the secondary brake circuit, the minimum deceleration of 2.44 m/s² is also achieved. The same applies to fault cases 34 and 35.

According to the teachings herein, a fault tolerance of a brake control system is improved by increasing a time for which fail-operational use can be ensured. In particular, according to the teachings herein, cost can be saved by enhancing a solution for upgrading existing brake control systems designed for driving according to Level 3 of the SAE-J3016 classification to Level 4 or Level 5.

In numerous embodiments, the primary and secondary brake circuits do not require hardware updates, which can also result in cost savings during development and manufacture of the brake control system. By using an additional control device and the switching apparatus, the complexity and installation space of the system can be reduced.

LIST OF REFERENCE NUMBERS

SG1, SG2, SG3 Control devices
A1, A2, B1, B2 Brake actuators
SE Switching apparatus
S1, S2, S3, S4 Switching elements
BS Brake control system
D Data transmission system
BN1, BN2, BN3 On-board power supplies
K Motor vehicle The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measures cannot be used to advantage. Any reference signs in the claims should not be construed as limiting the scope.

What is claimed is:

1. A brake control system for a road vehicle, comprising:
a first control device for controlling a first brake actuator of the road vehicle;
a second control device for controlling a second brake actuator of the road vehicle, wherein the second control device does not control the first brake actuator and the first control device does not control the second brake actuator;
a third control device for controlling the first brake actuator and the second brake actuator; and
an electric switching apparatus, which is configured to selectively connect the third control device to one or more of the first brake actuator and to the second brake actuator depending on a fault status of the brake control system;
wherein the switching apparatus is further configured, depending on the fault status, to one or more of: galvanically disconnect the first control device from the first brake actuator, and galvanically disconnect the second control device from the second brake actuator.

2. The brake control system of claim 1, wherein
the first control device can be connected to a first on-board power supply of the road vehicle in order to be supplied with power;
the second control device can be connected to a second on-board power supply of the road vehicle in order to be supplied with power; and
the third control device can be connected to the first and second on-board power supply in order to be supplied with power.

3. The brake control system of claim 2, wherein the third control device can be connected to a third on-board power supply of the road vehicle in order to be supplied with power.

4. The brake control system of claim 2, wherein
the first control device can be connected to another first brake actuator of the road vehicle and is configured to control the other first brake actuator; and/or
the second control device can be connected to another second brake actuator of the road vehicle and is configured to control the other second brake actuator.

5. The brake control system of claim 2, wherein
the switching apparatus is configured to connect the first control device to the first brake actuator depending on the fault status; and/or
the switching apparatus is configured to connect the second control device to the second brake actuator depending on the fault status.

6. The brake control system of claim 1, wherein the third control device can be connected to a third on-board power supply of the road vehicle in order to be supplied with power.

7. The brake control system of claim 6, wherein
the first control device can be connected to another first brake actuator of the road vehicle and is configured to control the other first brake actuator; and/or
the second control device can be connected to another second brake actuator of the road vehicle and is configured to control the other second brake actuator.

8. The brake control system of claim 6, wherein
the switching apparatus is configured to connect the first control device to the first brake actuator depending on the fault status; and/or
the switching apparatus is configured to connect the second control device to the second brake actuator depending on the fault status.

9. The brake control system of claim 1, wherein
the first control device can be connected to another first brake actuator of the road vehicle and is configured to control the other first brake actuator; and/or
the second control device can be connected to another second brake actuator of the road vehicle and is configured to control the other second brake actuator.

10. The brake control system of claim 9, wherein
the switching apparatus is configured to connect the first control device to the first brake actuator depending on the fault status; and/or
the switching apparatus is configured to connect the second control device to the second brake actuator depending on the fault status.

11. The brake control system of claim 1, wherein
the electric switching apparatus is configured to selectively connect the first control device to the first brake actuator depending on the fault status; and/or
the electric switching apparatus is configured to selectively connect the second control device to the second brake actuator depending on the fault status.

12. The brake control system of claim 11, wherein the electric switching apparatus comprises:
a first switching element for selectively connecting the first control device to the first brake actuator;
a second switching element for selectively connecting the third control device to the first brake actuator;

a third switching element for selectively connecting the third control device to the second brake actuator; and a fourth switching element for selectively connecting the second control device to the second brake actuator.

13. The brake control system of claim 1, wherein the first control device, the second control device, and the third control device can be connected to a data transmission system of the road vehicle in order to receive control commands for controlling one or more of the first and second brake actuator.

14. The brake control system of claim 1, wherein the brake control system comprises the first and second brake actuator;

the first control device and the third control device are each connected to the first brake actuator via the switching apparatus; and the second control device and the third control device are each connected to the second brake actuator via the switching apparatus.

15. A road vehicle comprising a brake control system with:

a first control device for controlling a first brake actuator of the road vehicle;

a second control device for controlling a second brake actuator of the road vehicle, wherein the second control device does not control the first brake actuator and the first control device does not control the second brake actuator;

a third control device for controlling the first brake actuator and the second brake actuator; and an electric switching apparatus, which is configured to selectively connect the third control device to one or more of the first brake actuator and to the second brake actuator depending on a fault status of the brake control system;

wherein the switching apparatus is further configured, depending on the fault status, to one or more of: galvanically disconnect the first control device from the first brake actuator, and galvanically disconnect the second control device from the second brake actuator.

* * * * *